United States Patent [19]

Ohrbom et al.

[11] Patent Number: 5,777,048

[45] Date of Patent: Jul. 7, 1998

[54] METHOD FOR MODIFIED AMINOPLAST COMPOUNDS, AMINOPLASTS OBTAINED THEREBY AND COATINGS CONTAINING THE SAME

[75] Inventors: Walter H. Ohrbom, Commerce Township; Donald H. Campbell, Farmington; Donald L. St. Aubin, Commerce Township, all of Mich.

[73] Assignee: BASF Corporation, Southfield, Mich.

[21] Appl. No.: 667,261

[22] Filed: Jun. 20, 1996

[51] Int. Cl.$^6$ ..................................................... C08F 8/30
[52] U.S. Cl. .......................... 525/509; 525/127; 525/157; 525/374; 525/518; 525/519; 525/443
[58] Field of Search ............................ 525/509, 374, 525/157, 519, 518, 127

[56] References Cited

U.S. PATENT DOCUMENTS

| | | | |
|---|---|---|---|
| 3,658,580 | 4/1972 | Roth | 117/139.4 |
| 4,520,167 | 5/1985 | Blank et al. | 525/131 |
| 4,677,168 | 6/1987 | Hoy et al. | 525/441 |
| 4,708,984 | 11/1987 | Forgione | 525/127 |
| 5,157,069 | 10/1992 | Campbell | 524/500 |
| 5,300,328 | 4/1994 | Rehfuss | 427/388.3 |
| 5,356,669 | 10/1994 | Rehfuss et al. | 427/407.1 |
| 5,373,069 | 12/1994 | Rehfuss et al. | 525/456 |
| 5,451,656 | 9/1995 | Menovcik et al. | 528/288 |
| 5,474,811 | 12/1995 | Rehfuss et al. | 427/407.1 |
| 5,475,064 | 12/1995 | Menocvik et al. | 525/441 |
| 5,508,379 | 4/1996 | Menovcik et al. | 528/367 |
| 5,512,639 | 4/1996 | Rehfuss et al. | 525/456 |
| 5,532,061 | 7/1996 | Menocvik et al. | 428/423.1 |
| 5,552,497 | 9/1996 | Taylor et al. | 525/456 |

Primary Examiner—Fred Zitomer
Attorney, Agent, or Firm—Anne Gerry Sabourin

[57] ABSTRACT

A method for reducing the molecular weight of aminoplast compounds, the aminoplast compounds obtained thereby, and coating compositions containing said aminoplast compounds are provided. The reduced molecular weight aminoplasts are obtained by reacting (a) an aminoplast compound, having a total number (y) of reactive substituents on the amino nitrogens of the aminoplast, where $y=(E \times M)$ and E=equivalents per mole of aminoplast and M=total number of moles of aminoplast, wherein the reactive substituents are selected from the group consisting of —NH, alkylol, alkoxy, alkoxyalkyl, and mixtures thereof and (b) at least one carbamate compound selected from the group consisting of unsubstituted and substituted primary carbamate compounds, unsubstituted and substituted secondary carbamate compounds and mixtures thereof, in the presence of primary or secondary alcohols, at temperatures under 150° C., and at pressures ranging between atmospheric pressure and 20 atm pressure, to form a functionalized aminoplast compound, wherein at least one and up to (y−1) of the amino substituents on the aminoplast are substituted with the carbamate functionality.

20 Claims, No Drawings

METHOD FOR MODIFIED AMINOPLAST COMPOUNDS, AMINOPLASTS OBTAINED THEREBY AND COATINGS CONTAINING THE SAME

BACKGROUND OF THE INVENTION

Aminoplast resins are widely utilized as curing agents for polymer compositions. Aminoplast resins are typically prepared by reacting certain polyamines such as melamine or urea with an aldehyde such as formaldehyde to form alkylol group substituents on the amino nitrogens. The alkylol groups may be alkylated by reaction with an alcohol to form alkylalkoxy groups. The alkylalkoxy or alkylol groups are reactive with a variety of functional groups that can be appended to polymer backbones. Such functional groups include hydroxyl, acid (e.g., carboxyl), carbamate, amide, and ureido groups.

Curable polymer compositions such as those cured with aminoplast resins are usually made to achieve a desired specification with regard to the physical properties of the cured polymer. Often, it is desired to achieve a cured polymer that exhibits a high level of hardness without being brittle. This can be a particularly desirable objective in curable coating compositions, where hardness provides durability to the coating and flexibility provides smooth, contiguous coatings that do not crack or peel when subjected to stress, temperature variations, and the like.

One way to achieve a desired level of hardness is to control the crosslink density of the cured polymer composition. This can be accomplished by varying the level or amount of functional crosslinkable groups on the polymer or by varying the relative amounts of polymer and aminoplast in the curable composition. The control of the crosslink density is still somewhat limited, however, and often a tradeoff must be made between hardness and flexibility. The result of this is that desired levels of hardness and brittleness cannot be concurrently achieved. In certain applications, such as with the clearcoat layer of a color-plus-clear composite coating, this tradeoff manifests itself with the observation that when a coating has sufficient hardness to exhibit the desired durability, an undesirable level of brittleness causes a variety of problems such as environmental etch. Environmental etch manifests itself as spots or marks on or in the clear finish of the coating that often cannot be rubbed out.

One method known in the art for controlling crosslink density is reaction of aminoplast with carbamate functional compounds at temperatures above 100° C. and under vacuum, with removal of the alcohol by-product. According to this method the alkylalkoxy groups on the aminoplast react with the carbamate groups. This reaction is problematic, in that side reactions may occur such as self condensation of the aminoplast, or reaction of the modified aminoplast with reactive groups such as hydroxyl or alkoxyl groups on the carbamate, to form ether bridges. The self condensation products are very high molecular weight compounds, and are frequently gelled and unusable. Even when usable, any increase in the molecular weight of the compounds can significantly increases the viscosity of coating compositions including these compounds. Additional solvent must be added to lower viscosity and optimize application of the coating composition, raising the volatile organic content (VOC) of a coating composition. Ether bridges which may be formed are undesirable as these decrease durability of coatings including the aminoplast crosslinkers.

It is desirable to provide a method for forming modified aminoplasts under mild reaction conditions, to minimize molecular weight growth of the aminoplasts and to provide lower molecular weight self-crosslinking aminoplasts.

SUMMARY OF THE INVENTION

The present invention is a method of modifying aminoplast compounds to provide lower molecular weight aminoplasts, the aminoplast compounds obtained thereby and coating compositions containing the aminoplast compounds. The aminoplast compounds may be useful as crosslinking agents for polymeric compositions, or may be used as a self-crosslinking composition. The compounds may also be used for rheology control or to improve durability of coatings.

The modified aminoplast is formed by reacting an aminoplast compound having —NH, alkylol, alkoxy or alkoxyalkyl substituents on the nitrogen substituents with a substituted or unsubstituted primary or secondary carbamate compound, in the presence of excess alcohol, under mild reaction conditions. The reaction is conducted at temperatures below 150° C. and preferably at temperatures between 60° and 90° C. and at pressures of between atmospheric pressure and 20 atm pressure. The carbamate blocking group is stable at temperatures up to 300° F. (148.9° C.). Above this temperature the carbamate modified aminoplast reacts or unblocks to react with a carbamate reactive functionality on another polymeric resin or to self crosslink. The primary or secondary carbamate may also include an additional functionality reactive with the aminoplast compound, where self-crosslinking of the aminoplast compound is desired. The resultant reaction product is a carbamate modified aminoplast compound. The term modified aminoplast refers to the reaction product of an —NH, alkylol, alkyl, or alkoxyalkyl substituted aminoplast and the carbamate compound.

DETAILED DESCRIPTION OF THE PREFERRED EMBODIMENT

Aminoplast compounds are modified to reduce their molecular weight, by reacting aminoplast compounds having —NH, alkylol, alkyl, alkoxyalkyl substituents, with a carbamate functional compound in the presence of alcohol. This reaction is typically carried out by heating a melt or a solution, e.g., in benzene, toluene, xylene, cyclohexane and the like. A catalyst, can be used. The reaction temperature should be less than 150° C., and is preferably 60°–90° C., and the pressure is between atmospheric pressure and 20 atm pressure. Temperatures between 60° and 90° C. provide the most desirable results in terms of low molecular weight modified aminoplasts. The degree of substitution on the aminoplast substituents can be controlled by adjusting the stoichiometric amount of alkyl carbamate to the desired degree of substitution. Equimolar amounts or an excess of aminoplast must be utilized to obtain the preferred reaction product.

The preferred carbamate functional compounds for purposes of the present invention are primary or secondary carbamates. The carbamate can be substituted or unsubstituted. The substituents on the carbamate may be a reactive group, such as hydroxy, amino or isocyanate, or ethylenically unsaturated groups, or may be an unreactive group such alkyl, cycloaliphatic, aryl, ester, or ether groups. The carbamate may also include a linking group such as O, S, Si, N, P in combination with the reactive or non-reactive substituents.

The carbamates may be obtained by any method known in the art. For example, alcohols, amines or carbonates, may be converted to carbamates. An alcohol used in the preparation of carbamates is defined herein as having one or more OH groups. Various alcohols can be used in the preparation of carbamate compounds according to the invention. They generally have from 1 to 160 carbon atoms, preferably 1–60 carbon atoms, and may be monofunctional or polyfunctional (where polyfunctional preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol,1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

Various methods may be used to form the carbamate functional compounds. For example, the alcohol can be reacted with a urea to form a compound with carbamate group(s). This reaction is accomplished by heating a mixture of the alcohol and urea. Another technique is the reaction of a polyol with a monoisocyanate (e.g., methyl isocyanate) to form a compound with multiple secondary carbamate groups or to react an alcohol with cyanic acid to form a compound with primary carbamate groups(s) (i.e., unsubstituted carbamates). This reaction is also performed under heat, preferably in the presence of a catalyst as is known in the art. Carbamates may also be prepared by reaction of an alcohol with phosgene and then ammonia to form a compound having primary carbamate group(s), or by reaction of a polyol with phosgene and then a primary amine to form a compound having secondary carbamate groups. Carbamates can also be prepared by a transcarbamylation approach where an alcohol or hydroxyalkyl carbamate is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). A cyclic carbonate such as ethylene carbonate can be converted to a carbamate by reaction with a primary or secondary amine or diamine.

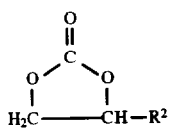

The R² group is primary or secondary carbamate having from 1 to 16 carbon atoms.

Other techniques for preparing carbamates are also known in the art and are described, for example, in P. Adams & F. Baron, "Esters of Carbamic Acid", *Chemical Review*, v. 65, 1965.

Aminoplast compounds used according to the invention are well-known in the art. The aminoplasts may be substituted with —NH, alkylol, alkyl, or alkoxyalkyl groups and mixtures of these. The most common aminoplast resins are aldehyde condensation products of aminoplast precursors such as melamine, urea, benzoguanamine, or other similar compounds, although aldehyde condensates of other aminoplast precursors, such as triazines, diazines, triazoles, guanidines, guanamines, and alkyl or aryl-substituted derivatives of such compounds. Examples of useful aminoplast precursors include melamine, N,N'-dimethylurea, benzoguanamine, benzourea, dicyandiamide, 6-methyl-2,4-diamino-1,3,5-triazine, triaminopyrimidine, and the like. These aminoplast precursors are typically reacted in a condensation reaction with formaldehyde, although the benefits of the invention could also be achieved using other aldehydes such as acetaldehyde, benzaldehyde, and the like. Polymeric aminoplast resins may also be used in the process of the present invention. Examples of polymeric aminoplasts include Resimene® 717 from Monsanto and Cymel® 327 from Cytec.

The above-described aminoplast compounds may be alkylated by reaction with an alcohol, such as methanol, ethanol, propanol, butanol, benzyl alcohol, and the like, with methanol and butanol being preferred.

According to the invention, the aminoplast is modified so that one or more of the total number of reactive substituents on the amino nitrogens of the aminoplast curing agent are either non-reactive with functional groups on other polymers having active hydrogen functionality or are reactive with these functional groups under different catalytic conditions or at a higher temperature than the temperature at which the aminoplast substituents are reactive with the functional groups on other polymers. This is accomplished by reacting the aminoplast with carbamate compound so that substituents on the aminoplast amino nitrogens are carbamate substituted.

For purposes of the present invention, the number of carbamate substitutions possible is described as follows. The aminoplast amino nitrogens have a total number of reactive substituents (y), where y=(E×M), where E represents the equivalents of reactive substituents per mole of aminoplast and M is the total number of moles of aminoplast. At least one equivalent of the total number of reactive substituents available, and up to ⅚ of the total number of reactive substituents on the aminoplast are substituted with the carbamate functionality. This is illustrated as follows. When monomeric melamine aminoplast compounds are used, a maximum number of six reactive substituents on the amino nitrogens per mole of melamine are available. At least one molecule of the total number of equivalents (y) and up to ⅚ of the total number of reactive substituents may be substituted with carbamate. Where monomeric urea aminoplasts are used, a maximum number of four reactive substituents are available on the amino nitrogens per mole of urea. At least one molecule of the total number of equivalents (y) and up to ¾ of the total number of reactive substituents (y) may be substituted with carbamate. For purposes of the present invention, the preferred equivalents ratio of aminoplast to carbamate is 2:1. The ratio of aminoplast compound to carbamate compound is selected to provide the desired degree of substitution on the aminoplast. It is critical for purposes of the present invention that excess or equimolar amounts of aminoplast compound be used in the reaction.

The reaction between the aminoplast compound and carbamate functional compound or compounds, is conducted in the presence of a solvent which is a primary or secondary alcohol. Examples of alcohols suitable for solvent include butanol, isobutanol, t-butanol, methanol, 1,2-propane diol, 1-methoxy-2-propanol, and 1-butoxy-2-propanol.

The reaction between the aminoplast compound and carbamate compound can be catalyzed with a catalyst such a Lewis acid, a proton acid, a mineral acid, or alkyl substituted mineral acid. Examples of these catalysts include dibutyl tin dilaurate; dimethyl tin dilaurate; aluminum isopropoxide phosphoric acid; nitric acid; sulfurous acid; and alkyl and/o aryl substituted acids selected from the group consisting of phosphoric acid, nitric acid, phosphonic acid, sulfonic acid or sulfuric acid, and trifluoroacetic acid.

The carbamate-modified aminoplast curing agents can be represented by the formulas:

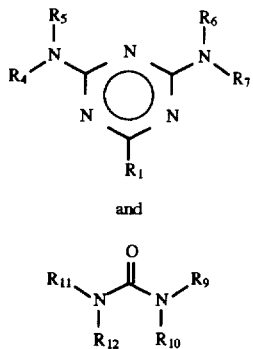

and

In these formulas, $R_1$ is phenyl or

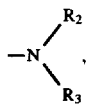

and
$R_2$–$R_7$ and $R_9$–$R_{12}$ are each independently —$CH_2OR_8$ or —$CH_2$—NR'—$CO_2R$", wherein $R_8$ is H, alkyl, or aryl, R' is H, alkyl, cycloaliphatic, or aryl and R" is alkyl, cycloaliphatic or aryl, with the proviso that at least one of $R_2$, $R_3$, $R_4$, $R_5$, $R_6$, and $R_7$ are —$CH_2OR_8$ and at least one of $R_2$, $R_3$, $R_4$, $R_5$, $R_6$, and $R_7$ are —$CH_2$—NR'—$CO_2R$". It should be understood that in the context of the present invention, alkyl can include substituted alkyl, cycloaliphatic and aryl, where the substituents would not have an adverse impact on the performance of the invention. Examples of the substituents on the alkyl, cycloaliphatic, or aryl groups include ester, ether, ketones, ethylenically unsaturated groups, and tertiary amino groups. The above alkyl groups are preferably of 1–8 carbon atoms, and the above aryl group is preferably of 6–12 carbon atoms. Examples of useful alkyl groups for the above R groups include methyl, ethyl, n-propyl, n-butyl, iso-butyl, cyclohexyl, 3-chloropropyl, allyl, 2-methoxy propyl, dimethyl ethylene amine, 3-methyl-2-butanol and benzyl. Examples of useful aryl groups for $R_8$ include phenyl, naphthyl, 2-chlorophenyl, 4-chlorophenyl, 2-tolyl, and 4-tolyl.

In one preferred embodiment, the compound is an aminoplast where $R_1$ is

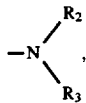

three of $R_2$, $R_3$, $R_4$, $R_5$, $R_6$, and $R_7$ are —$CH_2OR_8$ and three of $R_2$, $R_3$, $R_4$, $R_5$, $R_6$, and $R_7$ are —$CH_2$—NR'—$CO_2R$".

The present invention also provides for aminoplast compounds modified with carbamate compounds including a reactive functionality. Examples of such functionalities include ethylenic unsaturation, hydroxy, amino and isocyanate groups. The carbamate may also include a linking group selected from O, Si, S, N, P and mixtures thereof.

The present invention also provides for self-crosslinking modified aminoplast compounds, where the aminoplast is reacted with a carbamate having a reactive functionality. In a preferred embodiment a hydroxy functional carbamate is used. In these instances the R' may be hydroxy alkyl secondary alkyl carbamate and mixtures thereof; ethylene oxide or propylene oxide hydroxy alkyl; hydroxy alkyl extended with ester, carbonate, ether or urethane groups; and lactone extended hydroxy alkyl. The hydroxy alkyl carbamates may include other functionalities in the alkyl group provided that these functionalities do not interfere with the reaction of the aminoplast resins and carbamate. Where a self-crosslinking aminoplast is desired, the aminoplast can be reacted with a mixture of carbamate compounds, where one carbamate compound reacts more slowly with the aminoplast compound. Examples of these include a primary carbamate with a sterically hindered primary carbamate compound or a mixture of a primary carbamate compound and a secondary carbamate compound. Additionally, a carbamate compound may be reacted with a protective group to slow its reactivity with the aminoplast compound. An example of this is reacting an isocyanate with carbamate.

The modified aminoplast can be used as a crosslinking agent by reacting the modified aminoplast with a polymer comprising functional groups reactive with the aminoplast curing agent. The polymer may be any of a number of known polymers, such as an alkyd, polyester, epoxy polymer (e.g., condensation polymer of polyglycidyl ether and bisphenol A), acrylic polymer (e.g., polymer of acrylic acid, methacrylic acid, butyl acrylate, hydroxypropyl methacrylate, etc.), vinyl polymer (e.g., polymer of styrene), or a polyurethane. The choice of polymer will depend on the particular desired characteristics. In one preferred embodiment where the curable composition is used as a coating composition, particularly a surface coating composition, the polymer is an acrylic polymer, an acrylic/vinyl copolymer, a polyurethane, an epoxy polymer, or a polyester, and more preferably an acrylic or acrylic vinyl copolymer.

The functional group(s) that can be utilized on the polymer can be any group that is reactive with the alkoxy or alkylalkoxy group of an aminoplast curing agent. Generally, such functional groups include an active hydrogen. Examples of useful functional groups include carbamate, hydroxyl, carboxyl, phenolic, benzylic, amide, and ureido groups. Preferably, the functional group is carbamate or hydroxyl, and more preferably, the functional group is carbamate. Techniques for incorporation of such functional groups into polymer materials are well-known in the art. For example, carbamate-functional polymers are described in U.S. Pat. Nos. 3,479,328, 3,674,838, 4,126,747, 4,279,833, 4,340,497, and 5,300,328. Hydroxyl-functional acrylic polymers are typically formed by the copolymerization of hydroxyalkyl esters of acrylic or methacrylic acid with other acrylic or vinyl monomers. Acid-functional acrylics are easily prepared by the copolymerization of acrylic acid or methacrylic acid with other acrylic or vinyl monomers. Hydroxyl-functional polyurethanes are typically prepared by the reaction of polyisocyanates with excess quantities of polyols having two or more hydroxyl groups per molecule. Acid or hydroxy-functional polyesters are formed by the reaction of polyacids with polyols, the acid or hydroxyl functionality being determined by the respective amounts of acid or hydroxyl functionality present in the starting materials. The above description is representative in nature, and it is understood that other polymers known in the art to have functional groups reactive with aminoplast curing agents can be used in the practice of the present invention.

The modified aminoplast compounds according to the present invention provide coating compositions with lower VOC content than similar coating compositions using nonmodified aminoplast resins. Coating compositions containing the modified aminoplasts can utilize the aminoplasts as self crosslinking compounds. The compositions are useful alone as crosslinkers in coating compositions or may be combined with other crosslinking resins, such as isocyanate crosslinkers. The modified aminoplast compounds are also useful as additives in coatings. Examples of these include, among others, additives to improve durability and rheology control agents.

The curable composition of the invention may be utilized in a variety of applications, such as castings, moldings, and coatings. A solvent may optionally be utilized in the composition of the present invention. Although the composition of the present invention may be utilized, for example, in the form of substantially solid powder, or a dispersion, it is often desirable that the composition is in a substantially liquid state, which can be accomplished with the use of a solvent. This solvent should act as a solvent with respect to both (a) the carbamate-functional aminoplast and (b) the polymeric compound having a functional group reactive with the aminoplast. In general, depending on the solubility characteristics of components (a) and (b), the solvent can be any organic solvent and/or water. In one preferred embodiment, the solvent is a polar organic solvent. More preferably, the solvent is a polar aliphatic solvent or polar aromatic solvent. Still more preferably, the solvent is a ketone, ester, acetate, alcohol, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, n-methylpyrrolidone, or blends of aromatic hydrocarbons. In another preferred embodiment, the solvent is water or a mixture of water with small amounts of aqueous co-solvents.

The composition of the invention may include a catalyst to enhance the cure reaction. For example, when aminoplast compounds, especially monomeric melamines, are used as component (a), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester.

In a preferred embodiment of the invention, the composition of the invention is utilized as a pigmented coating composition or clearcoat coating composition. In such a composition, the solvent may be present in the composition of the invention in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

In a particularly preferred embodiment, the composition of the invention is used as a clear and/or colorless coating composition over a pigmented basecoat as part of a composite color-plus-clear coating. Such composite coatings are popular for their depth of color and liquid glossy surface appearance. They have found particularly wide acceptance in the field of automotive coatings. The composition of the invention may also be used as the basecoat of a composite color-plus-clear coating.

Other pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast, isocyanate, blocked isocyanates (including isocyanurates), acid functional, or anhydride functional cross-linking agent, or a mixture of these crosslinkers.

After an article is molded, casted, or coated with the above-described layers, the composition is subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the aminoplast and functional polymer used, however they generally range between 93° C. and 177° C., and are preferably between 121° C. and 141° C. The curing time will vary depending on the particular components used, and physical parameters such as the thickness of the layers, however, typical curing times range from 15 to 60 minutes.

The invention is further described in the following non-limiting examples.

EXAMPLE 1

Carbamate Modified Melamine

A mixture of 1002.4 parts Resimene® 747, a hexa (methoxymethyl) melamine from Monsanto, 650 parts of n-butyl carbamate, 200 parts methanol and 5.1 parts of dodecyl benzene sulfonic acid was heated to 75° C. The reaction continued until the level of free butyl carbamate, as measured by gas phase chromatography, was less than 6% of the starting amount. The excess n-butyl carbamate and methanol was then removed by a brief (<2 hr) vacuum strip at temperatures at or below 75° C. The vacuum was then removed and 368.5 parts of n-butanol added. The compound had a number average molecular weight of 762, and a weight average molecular weight of 1260, as determined by gel permeation chromatography using polystyrene standards.

EXAMPLE 2

Low Molecular Weight Carbamate Modified Melamine

A mixture of 2445.4 parts of Cymel® 300, a hexa (methoxymethyl) melamine, from Cytec, 1614 parts of hydroxy propyl carbamate, and 1396 parts of methanol are heated to 49 C. 18.1 parts of dodecyl benzene sulfonic acid is then added, and the system heated to 70 C. The system is allowed to react at 70° C. until the level of free hydroxy propyl carbamate, as measured by gas phase chromatograpy is less than 4% of the starting amount. The system is then cooled to room temperature and methanol removed by vacuum strip. The compound had a number average molecu lar weight of 801 Daltons, and a weight average molecular weight of 1291.

EXAMPLE 3
High Molecular Weight Modified Melamine

A mixture of 1500 parts of Resimene® 747, a hexa (methoxymethyl) melamine from Monsanto, and 1241.8 parts of butyl carbamate are heated to 36° C. under nitrogen atmosphere. 1.36 parts of dodecyl benzene sulfonic acid is then added, the inert atmosphere is removed and 15 inches of vacuum are applied. The system is then heated to 100° C., while increasing the vacuum to >24 inches until 322.2 parts of methanol are removed. The vacuum and heat are then removed, and 454.9 parts of xylene are added. The resultant modified melamine had a number average molecular weight of 1322, and a weight average molecular weight of 7287.

EXAMPLE 4
High Molecular Weight Modified Melamine

A mixture of 390 parts of Resimene® 747, a hexa (methoxymethyl) melamine from Monsanto, and 257.8 parts of butyl carbamate are heated under nitrogen atmosphere to 60° C. 0.32 parts of dodecyl benzene sulfonic acid is then added, the inert atmosphere is removed and >25 inches of vacuum are applied. The system is slowly heated to 110° C. until 70.4 parts of methanol are removed. The vacuum and heat are then removed, and 109.4 parts of xylene are then added. The modified melamine had a number average molecular weight of 948 and a weight average molecular weight of 2122.

EXAMPLE 5
Self Cure of Hydroxy Propyl Carbamate Modified Melamine

A sample of hydroxy propyl carbamate modified melamine made as described above in Example 2, but taken before the vacuum strip was drawn down (8 mm) on a glass slide, air dried, then baked for 30 minutes at 280° F. The resulting cured film passed 200 MEK double rubes with scratching into the surface.

EXAMPLE 6
Clearcoat Formulation using Unmodified Melamine

| Ingredient | Amount |
| --- | --- |
| Carbamate functional acrylic | 478.0 g |
| Melamine[1] | 49.2 |
| Ultraviolet Absorber[2] | 12.6 |
| Hindered Amine Light Stabilizer[3] | 6.0 |
| Catalyst[4] | 16.0 |
| Fumed silica dispersion | 20.2 |
| Flow additive[5] | 0.8 |
| Adhesion additive | 6.7 |
| Octanoic acid | 1.3 |
| Butanol | 32.0 |
| Solvent[6] | 20.0 |

[1]Resimene 747 from Monsanto
[2]Tinuvin 384
[3]Tinuvin 123
[4]Nacure 5225
[5]Lindron 22
[6]Exxate 1000

This sample was then reduced with Aromatic 100 to 35" on a #4 Ford cup at 80° F. Solids were measured at 53.5% by weight

EXAMPLE 7
Clearcoat Formulation using Modified Melamine

| Ingredient | Amount |
| --- | --- |
| Carbamate Functional Acrylic | 395.8 g |
| Modified Melamine from Ex. 1 | 128.6 |
| UVA[1] | 12.6 |
| HALS[2] | 6.0 |
| Catalyst[3] | 16.0 |
| Fumed silica dispersion | 20.2 |
| Flow additive[4] | 0.8 |
| Adhesion additive | 6.7 |
| Octanoic acid | 1.3 |
| Butanol | 7.0 |
| Solvent[5] | 20.0 |

[1]Tinuvin 384
[2]Tinuvin 123
[3]Nacure 5225
[4]Lindron 22
[5]Exxate 1000

This sample was then reduced with Aromatic 100 to 35" on a #4 Ford cup at 80° F. Solids were measured at 56.2% by weight

We claim:

1. A method for reducing molecular weight growth of aminoplast compounds comprising reacting
   (a) an aminoplast compound, having a total number (y) of reactive substituents on the amino nitrogens of the aminoplast, where y=(E×M) and E=equivalents of reactive substituents per mole of aminoplast and M=total number of moles of aminoplast, wherein the reactive substituents are selected from the group consisting of —NH, alkylol, alkoxy, alkoxyalkyl, and mixtures thereof and
   (b) at least one carbamate compound selected from the group consisting of unsubstituted and substituted primary carbamate compounds, unsubstituted and substituted secondary carbamate compounds and mixtures thereof, wherein the carbamate is substituted with functionality selected from the group consisting of ethylenic unsaturation, hydroxy, amino and isocyanate functionality, in the presence of primary or secondary alcohols, at temperatures under 150° C., and at pressures ranging between atmospheric pressure and 20 atm pressure, to form a modified aminoplast compound, wherein at least one equivalent and up to E-1/E of the total number of reactive substituents on the aminoplast nitrogens are substituted with carbamate functionality, and the carbamate functionality on the melamine is either not involved in a crosslinking reaction, or reacts at a higher temperature than the temperature at which the methyol and/or methylalkoxy substituents react.

2. The method of claim 1 wherein the reaction is conducted at temperatures between 60° C. and 90° C.

3. The method of claim 1 wherein the aminoplast compound is selected from the group consisting of alkylated aldehyde melamine condensation products and urea formaldehyde condensation products.

4. The method of claim 1 wherein the carbamate compound has the formula $CH_2$—$NR'$—$CO_2R''$, where R' is selected from the group consisting of H, and substituted and unsubstituted alkyl, aryl, and cycloaliphatic groups, and mixtures thereof, wherein the alkyl group is from 1 to 16 carbon atoms, and where R" is selected from the group consisting of substituted and unsubstituted alkyl, cycloaliphatic, aryl, and mixtures thereof.

5. The method of claim 1, wherein the carbamate compound has the formula $CH_2$—$NR'$—$CO_2R''$, wherein R' is H and R" is selected from the group consisting of substituted and unsubstituted alkyl, aryl, and cycloaliphatic groups, and mixtures thereof.

6. The method of claim 4 or 5 wherein the alkyl, cycloaliphatic or aryl functionality on the carbamate includes functionality selected from the group consisting of hydroxyl, amino, isocyanate, ethylenically unsaturated groups, and mixtures thereof.

7. The method of claim 6 wherein the carbamate includes a heteroatom linking group selected from the group consisting of O, S, Si, N, and P.

8. The method of claim 1 wherein the carbamate includes a heteroatom as a linking group selected from the group consisting of O, S, Si, N, and P.

9. The method of claim 8 wherein the carbamate includes a functionality selected from the group consisting of unsubstituted alkyl, aryl, cycloaliphatic, ester and ether groups, and mixtures thereof.

10. The method of claim 4 or 5 wherein the substituted alkyl is selected from the group consisting of hydroxy alkyl; ethylene oxide hydroxy alkyl; propylene oxide hydroxy alkyl; hydroxy alkyl extended with compounds selected from the group consisting of esters, carbonates, ethers, urethanes, lactone; and mixtures thereof.

11. The method of claim 1 wherein the carbamate-modified aminoplast curing agents is represented by the formulas:

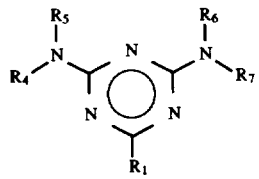

wherein, R₁ is phenyl or

$R_2$–$R_7$ and $R_9$–$R_{12}$ are each independently —CH$_2$OR$_8$ or —CH$_2$—NR'—CO$_2$R", wherein R$_8$ is H, alkyl, or aryl, R' is selected from the group consisting of H, and substituted and unsubstituted alkyl, cycloaliphatic, and aryl groups and R" is selected from the group consisting of substituted and unsubstituted alkyl, cycloaliphatic, and aryl groups, with the proviso that at least one of R$_2$, R$_3$, R$_4$, R$_5$, R$_6$, and R$_7$ are —CH$_2$OR$_8$ and at least one of R$_2$, R$_3$, R$_4$, R$_5$, R$_6$, and R$_7$ are —CH$_2$—NR'—CO$_2$R".

12. The method of claim 11 where R₁ is

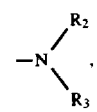

three of R$_2$, R$_3$, R$_4$, R$_5$, R$_6$, and R$_7$ are —CH$_2$OR$_8$ and three of R$_2$, R$_3$, R$_4$, R$_5$, R$_6$, and R$_7$ are —CH$_2$—NR'—CO$_2$R".

13. The method of claim 11 wherein the aminoplast is a melamine aminoplast, and an average of 5 of the substituents on the amino nitrogens of the melamine are carbamate substituents.

14. The method of claim 11 wherein the aminoplast is a melamine aminoplast, and an average of 3 of the substituents on the amino nitrogens of the melamine are carbamate substituents.

15. The method of claim 6 wherein the carbamate compound comprises a mixture of carbamate compounds, having varying rates of reactivity with the aminoplast compound.

16. The method of claim 1 wherein the aminoplast curing agent obtained thereby has the formula:

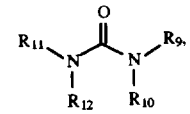

wherein
$R_9$, $R_{10}$, $R_{11}$, and $R_{12}$ are each independently alkyl, —CH$_2$OR$_8$ or —CH$_2$—NR'—CO$_2$R", wherein R$_8$ is H or alkyl, R' is selected from the group consisting of H, substituted and unsubstituted alkyl, cycloaliphatic, and aryl groups and mixtures thereof, and R" is selected from the group consisting of substituted and unsubstituted alkyl, cycloaliphatic and aryl, with the proviso that at least one of $R_9$, $R_{10}$, $R_{11}$, and $R_{12}$ are —CH$_2$OR$_8$ and at least one of $R_9$, $R_{10}$, $R_{11}$, and $R_{12}$ are —CH$_2$—NR'—CO$_2$R".

17. The method of claim 1 wherein the equivalents ratio of aminoplast to carbamate is 2:1.

18. An aminoplast compound obtained by the method of claim 1.

19. A coating composition comprising
(A) a polymer comprising functional groups that are reactive with the reactive substituents on the amino nitrogens of an aminoplast curing agent,
(B) an aminoplast curing agent prepared according to the method of claim 1.

20. The method of claim 1 wherein the reaction is conducted at temperatures between 60° and 120° C.

* * * * *